(12) United States Patent
Kawaji

(10) Patent No.: US 7,992,018 B2
(45) Date of Patent: Aug. 2, 2011

(54) SYSTEM DEVICE INCLUDING NIC AND POWER-SAVING CONTROLLING METHOD OF THE SAME

(75) Inventor: Seiji Kawaji, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 801 days.

(21) Appl. No.: 11/945,333

(22) Filed: Nov. 27, 2007

(65) Prior Publication Data

US 2008/0133953 A1 Jun. 5, 2008

(30) Foreign Application Priority Data

Nov. 30, 2006 (JP) .................................. 2006-323003

(51) Int. Cl.
G06F 1/26 (2006.01)
G06F 1/32 (2006.01)

(52) U.S. Cl. ........ 713/320; 713/300; 713/322; 713/324; 709/250

(58) Field of Classification Search .................. 713/300, 713/320, 322, 324; 709/250
See application file for complete search history.

(56) References Cited

U.S. PATENT DOCUMENTS

| | | | |
|---|---|---|---|
| 7,082,530 B1 * | 7/2006 | Diamant | 713/153 |
| 7,454,540 B2 * | 11/2008 | Oshikiri et al. | 710/60 |
| 7,577,857 B1 * | 8/2009 | Henderson et al. | 713/320 |
| 2006/0171300 A1 * | 8/2006 | Oshikiri et al. | 370/223 |
| 2006/0187944 A1 * | 8/2006 | Takeo et al. | 370/408 |
| 2006/0209722 A1 * | 9/2006 | Takeo et al. | 370/254 |
| 2008/0133950 A1 | 6/2008 | Kawaji | |

FOREIGN PATENT DOCUMENTS

| | | |
|---|---|---|
| JP | 07-321874 | 12/1995 |
| JP | 2001-353929 | 12/2001 |
| JP | 2002-312056 | 10/2002 |
| JP | 2003-089254 | 3/2003 |
| JP | 2004-048532 | 2/2004 |
| JP | 2004-110215 | 4/2004 |
| JP | 2005-094679 | 4/2005 |
| JP | 2005-117232 | 4/2005 |
| JP | 2005-215628 | 8/2005 |
| JP | 2008-139932 | 6/2008 |

OTHER PUBLICATIONS

Co-pending U.S. Application filed Nov. 27, 2007.

* cited by examiner

*Primary Examiner* — Chun Cao
*Assistant Examiner* — Michael J Brown
(74) *Attorney, Agent, or Firm* — Renner, Otto, Boisselle & Sklar, LLP

(57) ABSTRACT

The object is to realize power-saving operation in a NIC portion while maintaining a processing ability necessary for services to be performed in a system device having a controller for a multi-CPU process including a NIC. A service request status in a predetermined period is comprehended through a total value obtained by summing weighting values corresponding to types of services and the following energy-saving process is executed in accordance with the total value. The energy-saving is determined whether a protocol process is performed by the NIC or the controller depending on the total value and if the process is performed by the controller, the power supply to the protocol process functional portion and the encryption process functional portion is turned off in the NIC.

5 Claims, 15 Drawing Sheets

FIG.2

[CASE EXAMPLE] NETWORK SERVICE PROVISION LIST

| TIME | (a) IP ADDRESS | (b) SERVICE | (c) WEIGHTING VALUE |
|---|---|---|---|
| 0'05'00 | 10.36.150.10 | COLOR SCAN REQUEST | 10 |
| 0'11'00 | 10.36.150.11 | WEB ACCESS | 4 |
| 0'11'01 | 10.36.150.12 | MFP STATUS REQUEST | 3 |
| 0'12'20 | 10.36.150.13 | PING | 1 |
| ... | ... | ... | ... |
| TOTAL | | | 18 |

FIG.3

[CASE EXAMPLE] COMBINATION OF ENERGY-SAVING PROCESSES FOR EACH CONDITION AND EFFECT THEREOF

| CONDITION =NUMBER OF COUNTERPARTS =TOTAL | ENERGY-SAVING PROCESS (1) | ENERGY-SAVING PROCESS (2) | ENERGY-SAVING PROCESS (3) | POWER CONSUMPTION | ENERGY SAVING |
|---|---|---|---|---|---|
| 20 OR MORE | MFPC/(NIC) | 500MHz | Enc HW | 4.0W | — |
| 19~10 | MFPC/(NIC) | 300MHz | Enc HW | 3.2W | ▲0.8W |
| 9~4 | (MFPC)/NIC | 300MHz | Enc SW | 2.9W | ▲1.1W |
| 3~0 | (MFPC)/NIC | — | — | 0.0W | ▲4.0W |
| | MFPC:0W NIC:4W | 500:2.0W 300:1.2W | HW:0.3W SW:0W | OTHERS:1.7W | |

[CASE EXAMPLE] NETWORK SERVICE PROVISION LIST
LIST AS OF 0'20'00

| TIME | (a) IP ADDRESS | (b) SERVICE | (c) WEIGHTING VALUE |
|---|---|---|---|
| 0'05'00 | 10.36.150.10 | COLOR SCAN REQUEST | 10 |
| 0'11'00 | 10.36.150.11 | WEB ACCESS | 4 |
| 0'11'01 | 10.36.150.12 | MFP STATUS REQUEST | 3 |
| 0'12'20 | 10.36.150.13 | PING | 1 |
| ... | | ... | ... |
| TOTAL | | | 18 |

⇑

(B)

AFTER 10 MINUTES (AT 0'30'00), FIRST SERVICE IS ERASED

| TIME | (a) IP ADDRESS | (b) SERVICE | (c) WEIGHTING VALUE |
|---|---|---|---|
| ERASED | | | |
| 0'11'00 | 10.36.150.11 | Web ACCESS | 4 |
| 0'11'01 | 10.36.150.12 | MFP STATUS REQUEST | 3 |
| 0'12'20 | 10.36.150.13 | PING | 1 |
| ... | | ... | ... |
| TOTAL | | | 8 |

FIG.5

[EXAMPLE 1] SAME NODE, DIFFERENT SERVICES

| TIME | (a) IP ADDRESS | (b) SERVICE | (c) WEIGHTING VALUE |
|---|---|---|---|
| 0'05'00 | 10.36.150.10 | COLOR SCAN REQUEST | 10 |
| 0'11'00 | 10.36.150.11 | WEB ACCESS | 4 |
| 0'11'01 | 10.36.150.12 | MFP STATUS REQUEST | 3 |
| 0'12'20 | 10.36.150.13 | PING | 1 |
| ... | ... | ... | ... |
| TOTAL | | | 18 |

FIG.6

[EXAMPLE 2] DIFFERENT NODES, SAME SERVICES

| TIME | (a) IP ADDRESS | (b) SERVICE | (c) WEIGHTING VALUE |
|---|---|---|---|
| 0'05'00 | 10.36.150.10 | COLOR SCAN REQUEST | 10 |
| 0'11'00 | 10.36.150.11 | COLOR SCAN REQUEST | 10 |
| 0'11'01 | 10.36.150.12 | COLOR SCAN REQUEST | 10 |
| 0'12'20 | 10.36.150.13 | COLOR SCAN REQUEST | 10 |
| ... | ... | ... | ... |
| TOTAL | | | 40 |

FIG.7

[EXAMPLE 3] SAME NODE, SAME SERVICES

| TIME | (a) IP ADDRESS | (b) SERVICE | (c) WEIGHTING VALUE |
|---|---|---|---|
| 0'05'00 | 10.36.150.10 | COLOR SCAN REQUEST | 10 |
| 0'11'00 | 10.36.150.11 | WEB ACCESS | 4 |
| 0'11'01 | 10.36.150.12 | MFP STATUS REQUEST | 3 |
| 0'12'20 | 10.36.150.10 | COLOR SCAN REQUEST | 10 |
| ... | ... | ... | ... |
| TOTAL | | | 17 |

FIG.8

[GENERAL DESCRIPTION OF NETWORK SERVICE PROVISION LIST]

| TIME | (a) IP ADDRESS | (b) SERVICE | (c) WEIGHTING VALUE |
|---|---|---|---|
| 0'05'00 | 10.36.150.10 | COLOR SCAN REQUEST | 10 |
| 0'21'00 | 10.36.150.11 | WEB ACCESS | 4 |
| 0'21'01 | 10.36.150.12 | MFP STATUS REQUEST | 3 |
| 0'22'20 | 10.36.150.13 | COLOR SCAN REQUEST | 10 |
| ... | ... | ... | ... |
| TOTAL | | | 17 |

SYSTEM DEVICE INCLUDING NIC AND POWER-SAVING CONTROLLING METHOD OF THE SAME

CROSS-NOTING PARAGRAPH

This Non-provisional application claims priority under 35 U.S.C. §119(a) on Patent Application No. 2006-323003 filed in JAPAN on Nov. 30, 2006, the entire contents of which are hereby incorporated herein by reference.

FIELD OF THE INVENTION

The present invention relates to a system device including a NIC (Network Interface Card) to provide various network services to external devices connected to a network and a power-saving controlling method of the system device.

BACKGROUND OF THE INVENTION

System devices including NICs for transmitting/receiving data through a network to provide various network services to external devices connected to the network include, for example, digital multi-function peripherals (hereinafter, MFPs), which are image forming apparatuses.

Recently, these MFPs perform general image processes, such as a scanner image process and image generation for printers, and processes such as input/output interface control, and have a multi-CPU configuration including a NIC CPU responsible for input/output data control for a connected network and an MFP CPU responsible for other processes.

An MFP controller is responsible for network services provided by the MFP and having various processing load level of the NIC CPU, for example, color scan network transmission, responses to web accesses, and responses to inquiries for MFP statuses.

Some network services closely relate to data encryption processes due to the nature of the services and a function may be included in some cases to use a dedicated encryption chip to execute the processes at high speed.

On the other hand, if no operation is performed or no data transmission/reception is performed for external devices connected to the network for a predetermined time period or more, the MFPs are conventionally shifted to an energy-saving mode by turning off a fixing heater, a printer controller, etc.

For example, Japanese Laid-Open Patent Publication No. 2003-089254 discloses a technology of driving an input/output portion to execute processes for network monitoring and data transmission/reception such that data can be transmitted/received even when an image forming apparatus is shifted to the energy-saving mode. Japanese Laid-Open Patent Publication No. 2004-110215 discloses a technology of putting an image forming apparatus into the power-saving state if it is detected that all the host computers connected through a network are turned off.

Japanese Laid-Open Patent Publication No. 7-321874 discloses a data communication apparatus that changes a clock frequency of a data processing CPU depending on communication speed to achieve power saving.

However, the conventional arts of Japanese Laid-Open Patent Publication No. 2003-089254 or 2004-110215 do not achieve the power-saving operation of the NIC itself, and the conventional art of Japanese Laid-Open Patent Publication No. 7-321874 only changes the operation clock frequency of the data processing CPU and cannot achieve reasonable power-saving operation corresponding to a plurality of functions included in the NIC.

For example, in the case of the NIC equipped with an encryption chip, although the high-speed processing ability of the encryption chip is effectively utilized for the "color scan network transmission", which is a network service with a high NIC CPU processing load, excessive electric power is problematically consumed for the "responses to inquiries for MFP statuses", which is a network service with a low processing load, since the process of the similar/same level is executed.

SUMMARY OF THE INVENTION

The present invention was conceived to solve above problems and it is therefore the object of the present invention to realize power-saving operation in a NIC portion while maintaining a processing ability necessary for requested services in a system device having a controller for a multi-CPU process including a NIC.

In order to achieve the above object, the present invention comprises the following technical means.

A first technical means is a system device comprising a NIC including a network I/F, a protocol process functional portion, and an encryption process functional portion as well as a controller responsible for overall control to provide various network services to external devices connected to a network, the controller performing, based on a condition determined depending on a service request status, power-saving control that selectively reduces or terminates processing abilities of the protocol process functional portion and/or the encryption process functional portion by applying to the protocol process functional portion and/or the encryption process functional portion of the NIC a combination of different energy-saving processes corresponding to the processing functions thereof to stepwise reduce electric power consumed by constituent elements of the process functional portions in accordance with the condition.

A second technical means is the system device comprising a NIC as defined in the first technical means, wherein the controller creates a network service provision list including at least record items that are information of time when service requests are made, identification information of nodes making service requests, types of requested services, and a weighting value of each type of services to determine the condition from the total value of the weighting values within a predetermined period.

A third technical means is the system device comprising a NIC as defined in the second technical means, wherein each time the system device performs a requested service, the controller adds information including the items of the service as a new record to the network service provision list and deletes old records that passed over update periods at predetermined time intervals for maintenance.

A fourth technical means is the system device comprising a NIC as defined in the second technical means, wherein the total of the weighting values is recalculated at predetermined time intervals.

A fifth technical means is the system device comprising a NIC as defined in the fourth technical means, wherein when it is checked, based on the identification information of the nodes, whether the records of the same node exist in the past records and if the records of the same node exist, the recalculation of the total is performed by subtracting the largest value of the past weighting values of the same node from the old total value and adding the largest weighting value of the records of the same node including the current record.

A sixth technical means is the system device comprising a NIC as defined in the fifth technical means, wherein the identification information is IP addresses.

A seventh technical means is the system device comprising a NIC as defined in the first technical means, wherein the number of counterparts making the service requests is reflected in the condition.

An eighth technical means is the system device comprising a NIC as defined in the first technical means, wherein in one of the energy-saving processes, it is determined whether a protocol process is performed by the NIC or the controller in accordance with the condition, and wherein if the process is performed by the controller, the power supply to the protocol process functional portion and the encryption process functional portion is terminated in the NIC.

A ninth technical means is the system device comprising a NIC as defined in the first technical means, wherein in another one of the energy-saving processes, an operation clock frequency is changed in a CPU, which is one of constituent elements of the protocol process functional portion and the encryption process functional portion, depending on the service request status.

A tenth technical means is the system device comprising a NIC as defined in the first technical means, wherein in yet another one of the energy-saving processes, encryption by hardware and encryption by software are switched in an encryption process executed by the encryption process functional portion depending on the service request status and wherein if the encryption process is executed by software, the power supply to the hardware is terminated.

An eleventh technical means is the system device comprising a NIC as defined in the first technical means, wherein the power consumption information of the constituent elements realizing the functions of the NIC is stored in a storage portion and wherein based on the power consumption information of the constituent elements acquired from the storage portion, the controller determines an optimum combination of the energy-saving processes depending on a request status in conventional technology documents.

A twelfth technical means is the system device comprising a NIC as defined in the first technical means, wherein the power-saving control is performed by executing a predetermined program with the CPU of the controller.

A thirteenth technical means is the system device comprising a NIC as defined in the twelfth technical means, wherein the predetermined program is acquired from a storage portion of the NIC portion.

A fourteenth technical means is the system device comprising a NIC as defined in the eleventh technical means, wherein the order of the power consumption in the energy-saving processes is preliminarily determined and wherein the order is adapted to the order of execution of the combined energy-saving processes.

A fifteenth technical means is the system device comprising a NIC as defined in the first technical means, wherein if a plurality of NICs are connected to the controller, a power-saving state of the other NIC portion is added to the condition for determining the combination of the energy-saving processes and/or the order of application of the combined energy-saving processes for one NIC portion.

A sixteenth technical means is a power-saving controlling method of a system device comprising a NIC including a network I/F, a protocol process functional portion, and an encryption process functional portion to provide various network services to external devices connected to a network, the method of performing, based on a condition determined depending on a service request status, power-saving control that selectively reduces or terminates processing abilities of the protocol process functional portion and/or the encryption process functional portion by applying to the protocol process functional portion and/or the encryption process functional portion of the NIC a combination of different energy-saving processes corresponding to the processing functions thereof to stepwise reduce electric power consumed by constituent elements of the process functional portions in accordance with the condition.

A seventeenth technical means is the power-saving controlling method of a system device comprising a NIC as defined in the sixteenth technical means, wherein a network service provision list is created which includes at least record items that are information of time when service requests are made, identification information of nodes making service requests, types of requested services, and a weighting value of each type of services to determine the condition from the total value of the weighting values within a predetermined period.

An eighteenth technical means is the power-saving controlling method of a system device comprising a NIC as defined in the sixteenth technical means, wherein the energy-saving processes include (1) determining whether a protocol process is performed by the NIC or the controller depending on a service request status and turning off the power supply to the protocol process functional portion and the encryption process functional portion in the NIC if the process is performed by the controller, (2) changing an operation clock frequency of a CPU of the NIC realizing the functions of the protocol process functional portion and the encryption process functional portion depending on the service request status, and (3) switching encryption by hardware and encryption by software in the NIC depending on the service request status and terminating the power supply to the hardware if the encryption process is executed by software.

BRIEF DESCRIPTION OF THE DRAWINGS

FIG. 2 depicts an example of a network service provision list according to the present embodiment;

FIG. 3 is an explanatory view of combinations of the energy-saving processes (1) to (3) for each condition and the energy-saving effects thereof;

FIG. 4 depicts an example of updating the network service provision list every ten minutes;

FIG. 5 is an explanatory view of a total calculation when a plurality of different service requests are made by the same node within a predetermined period;

FIG. 6 is an explanatory view of a total calculation when the same service request is made by different nodes within a predetermined period;

FIG. 7 is an explanatory view of a total calculation when the same service request is made by the same node within a predetermined period;

FIG. 8 is an explanatory view of a total calculation in a general case of a network service request list;

PREFERRED EMBODIMENTS OF THE INVENTION

Embodiments of the present invention will hereinafter be described with reference to the drawings, taking an MFP including a NIC as an example.

Figure 1:
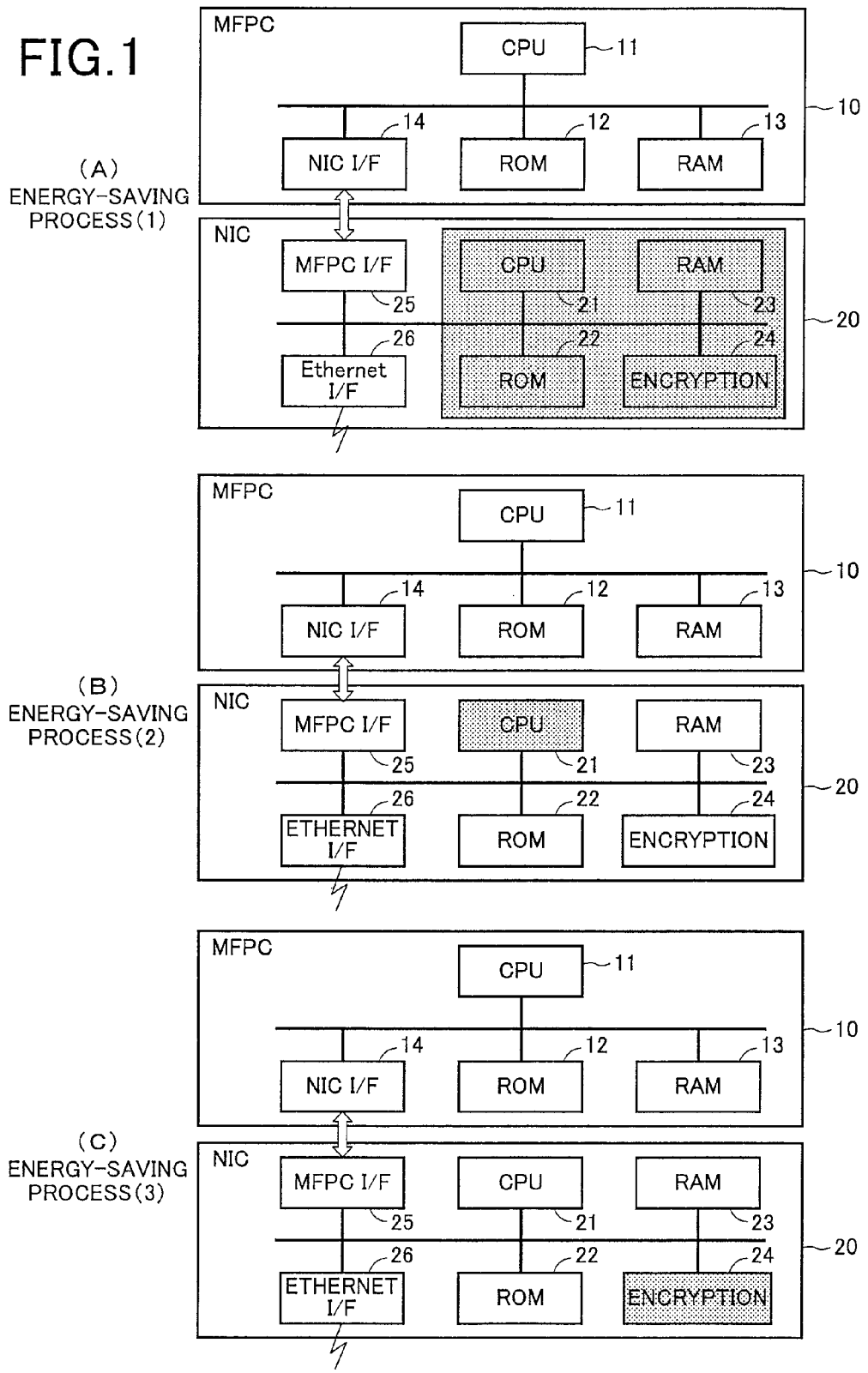
FIG. 1 is an explanatory view of locations on a NIC, which are targets of energy-saving processes, according to an embodiment of the present invention.

FIGS. 1(A) to 1(C) are explanatory views in the case of performing the power-saving control in an MFP having one NIC connected to a printer controller; FIG. 1(A) depicts an example of an energy-saving process (1); FIG. 1(B) depicts an example of an energy-saving process (2); FIG. 1(C) depicts an example of an energy-saving process (3); and shaded portions represent targets of the energy-saving processes described later.

In FIGS. 1(A) to 1(C), a printer controller 10 includes a CPU 11, a ROM 12, a RAM 13, and a NIC interface (NIC I/F) 14, and a NIC 20 connected to the printer controller 10 includes a CPU 21, a ROM 22, a RAM 23, an encryption chip (Encryption) 24, an MFPC interface (MFPC I/F) 25, and an Ethernet I/F 26.

The CPU 11 of the printer controller 10 realizes a function of performing various controls based on programs and information stored in the ROM 12. The program for performing the power-saving control of the present invention may preliminarily be stored in the ROM 12, or may be stored in a storage portion of the NIC and taken out and acquired by the printer controller 10 when the NIC is connected as described later. The CPU 21 executes a protocol process of data transmitted/received by the NIC 20 using programs and protocol information stored in the ROM 22. The RAM 23 temporarily and readably stores information necessary for the process of the CPU 21.

Since the power consumption for each operation clock frequency of the CPU and the power consumption of the encryption chip and other portions such as ROM and RAM are varied in the NIC depending on manufacturers, model numbers, etc., the appropriate combination of energy-saving processes described later can be achieved by preliminarily storing such information in a storage portion such as a flash memory and enabling the information to be read at the time of downloading of the power-saving control program.

The encryption processing function is realized in software by executing the program stored in the ROM 22 with the CPU 21 or by using hardware of the encryption chip 24.

FIG. 2 is an example of a network service provision list at a certain time; an item "time" indicates times when service requests are made; an item (a) indicates IP addresses of service request sources (nodes); an item (b) indicates service contents; an item (c) indicates weighting values. The weighting value of each service is determined in accordance with a level of the network processing load; for example, the color scan request is set to "10" since the processing load is high; the web access such as e-mail and internet fax is set to "4"; the MFP status request is set to "3"; and the ping is set to "1". Therefore, a total value of "18" is obtained by summing the weighting values and is set as a condition determined in accordance with a service request status.

FIG. 3 is a table showing energy-saving processes (1) to (3) used in the power-saving control of the present invention and the energy-saving effects thereof. The power-saving control performed in a combination of the energy-saving processes for each condition is executed by the CPU 11 of the printer controller using a predetermined program described later.

First, with regard to the energy-saving process (1), it is determined in this energy-saving process whether a network process including a protocol process is executed by the CPU 21 of the NIC 20 or by the CPU 11 of the printer controller 10 depending on the total values, and if the total value is three or less, power consumption of 4.0 W is saved by terminating the power supply to the CPU 21, the ROM 22, the RAM 23, and the encryption chip 24 (a hatching portion of FIG. 1(A)). In this case, the Ethernet I/F 26 is controlled by the CPU 11 of the printer controller 10, and the network process of received data is executed by the printer controller 10. In FIG. 3, "MFPC: 0 W" of the energy-saving process (1) is determined based on the idea that the CPU 11 of the printer controller 10 originally consumes electric power to operate the image process of received data and needs no new electric power if the protocol process executed by the CPU 21 of the NIC 20 is executed by the CPU 11 of the printer controller 10.

With regard to the energy-saving process (2), the operation clock frequency of the CPU 21 of the NIC 20 is changed depending on the total values (FIG. 1(B)); in this example, if the total value is 20 or more, the frequency is 500 MHz, which is maximum; and if the total value is 4 to 19, the frequency is lowered from 500 MHz to 300 MHz, which reduces the power consumption from 2.0 W to 1.2 W to save the difference of 0.8 W. If the total value is less than 4, the energy-saving process (2) has no impact since the power supply to the CPU 21 is terminated.

With regard to the energy-saving process (3), electric power is saved by switching a high-speed encryption process (Enc HW) using hardware, i.e., the encryption chip 24 (FIG. 1(C)), and an encryption process (Enc SW) using software depending on the total values, and in the table, the power consumption is 0.3 W when the encryption process is performed by the encryption chip 24 (Enc HW) and is zero when the encryption process is performed by software (Enc SW). When the encryption process is performed by software, the power consumption is defined as zero based on the idea that the CPU 21 originally consumes electric power to operate the network processes other than the encryption process and needs no new electric power for the encryption process.

Therefore, the encryption process (Enc HW) of the encryption chip having the high process ability is used if the total value is 10 or more, and the power saving effect of 0.3 W is acquired by executing the program stored in, for example, the ROM 22, to switch the process to the encryption process (Enc SW) of the software if the total value is 4 to 9.

The energy-saving effects acquired by applying the combinations of the above energy-saving processes are summarized for each condition as follows. In the case of the total value of 20 or more, the protocol process is executed at 500 MHz, which is the maximum operation clock frequency of the CPU 21 as described above; the electric power is also supplied to the encryption chip 24; the power consumption of other portions such as the ROM 22 and the RAM 23 is 1.7 W; therefore, total power consumption is 4.0 W; and the energy is not saved in this case.

In the case of the total value of 10 to 19, since the operation clock frequency of the CPU 21 of the NIC 20 is lowered to 300 MHz and the power consumption is reduced from 2.0 W to 1.2 W, the power-saving effect of 0.8 W is acquired. In the case of the total value of 4 to 9, since the encryption process is switched from the hardware (HW) to the software (SW) to reduce the power consumption to 2.9 W, the power-saving effect of 1.1 W is acquired.

In the case of the total value of 3 or less, the energy-saving effect of 4.0 W is acquired by terminating the power supply to the portions other than the Ethernet I/F 26 as described above.

FIG. 4 shows tables of an example of updating the network service provision list every ten minutes; a left table (A) is a list as of 0 o'clock 20 minutes; and a right table (B) is a list after 10 minutes, i.e., as of 0 o'clock 30 minutes. As can be seen from the tables, a record of color scan requested at 0 o'clock 5 minutes remains at 0 o'clock 20 minutes and is erased in the list of 0 o'clock 30 minutes, which changes the total from "18" to "8". The table of FIG. 4 shows that no new request is made in the past 10 minutes.

The calculation of the total is performed, for example, every 30 minutes and reflected to the operation for the energy-saving process in each case.

If a plurality of different service requests are made by the same node within a predetermined period, requests having smaller weighting values are removed from the total. For example, as shown in [Example 1] of FIG. 5, the weighting value "1" of "ping" requested at 0 o'clock 12 minutes 20 seconds is removed from the total since the "color scan request" having the weighting value "10" is made from the same node at 0 o'clock 5 minutes.

To utilize the total value as an index representing how much processing is necessary for the printer controller and the NIC in a given time period in the network environment to which the MFP is connected, the "different nodes/same services" in a predetermined period as shown in [Example 2] of FIG. 6 are all used in the calculation.

If the same services exist for the same node in a predetermined period as shown in [Example 3] of FIG. 7, only one service is extracted and others are removed from the total.

A general case of a network service request list will be described with reference to FIG. 8. It is assumed that the list is updated every 30 minutes and that the current time is 0 o'clock 25 minutes. The total is calculated every time another arbitrary time elapses. Assuming that the total is calculated every 15 minutes in this case, the color scan service at 0 o'clock 5 minutes of a node "10.36.150.10" is not added to the total in consideration of the current time.

The process flows in the case of executing the above energy saving will be described with reference to FIGS. 9 to 16. In FIGS. 9 to 16, "Et", "Rf", and "Enc" means wired (Ethernet), wireless (Radio Frequency), and Encryption, respectively, and are used in the following description.

Figure 9:
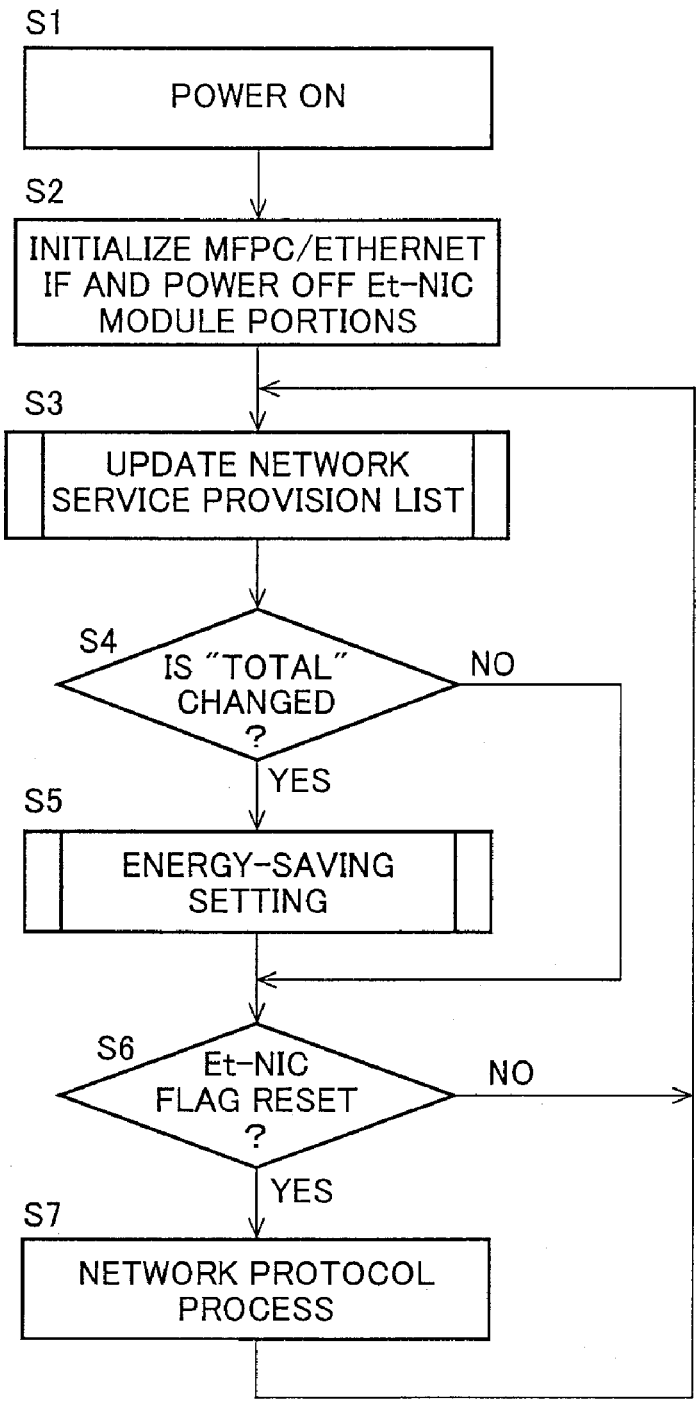
FIG. 9 depicts a flow of processes executed by a CPU of a printer controller.

FIG. 9 depicts a flow of processes executed by the CPU 11 of the printer controller 10. When the apparatus is powered on (step S1), the printer controller 10 and the Ethernet I/F 26 are initialized; Et-NIC module portions are turned off (step S2); and the network service provision list updating process is executed (step S3). It is then determined at step S4 whether the total value is changed; if the total value is changed (step S4/Y), the energy-saving setting is performed in accordance with the total value (step S5); and the flow goes to step S6. If the total value is not changed at step S4, the flow directly goes to step S6; if the Et-NIC flag has been reset (step S6/Y), the protocol process of network data is executed (step S7) and the flow goes back to step S3. If the Et-NIC flag has not been reset (step S6/N), the flow directly goes back to step S3.

Figure 10:
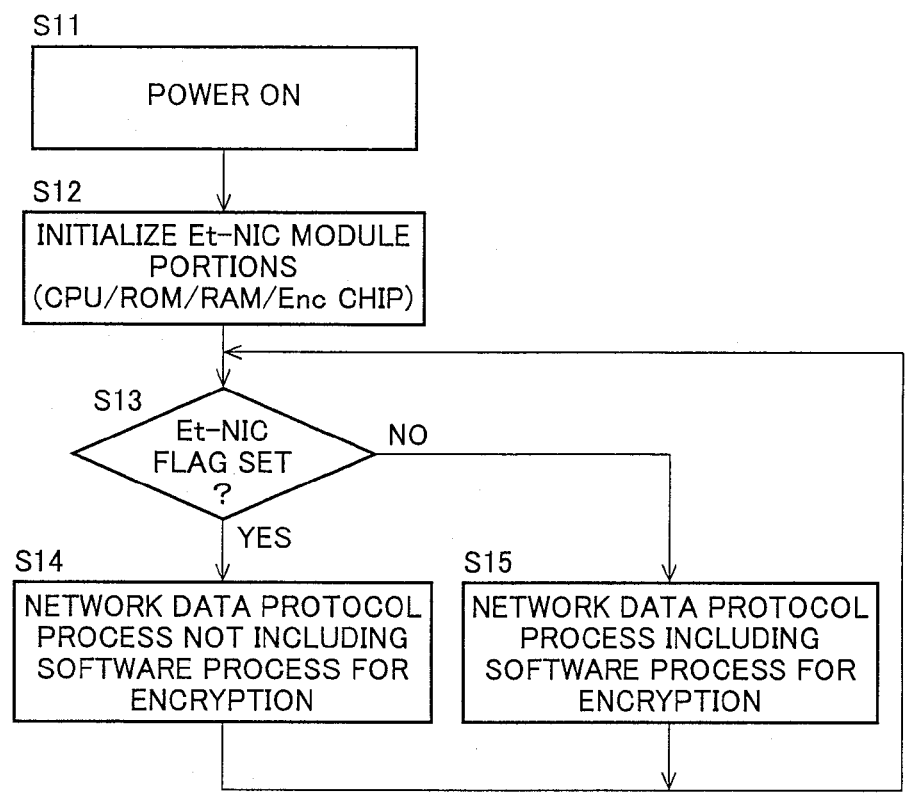
FIG. 10 depicts a flow of processes executed by a CPU of Et (wired) NIC in the combinations of the energy-saving processes.

FIG. 10 depicts a CPU process flow of the Et-NIC and is the case when the total value is changed at step S4 of the flow of FIG. 9 and when the network process and the encryption process are executed by the NIC in the energy-saving setting of step S5.

That is, if the total value is "4" or more as in this example, the power is turned on under the control of the printer controller 10 (step S11) and, first, the Et-NIC module portions (the CPU 21, the ROM 22, the RAM 23, and the encryption chip 24) are initialized (step S12). If the flag of the Et-Enc has been set (step S13/Y), the network data protocol process is executed without the inclusion of the software process for the encryption (step S14); and if the flag of the Et-Enc has not been set (step S13/N), the network data protocol process is executed with the inclusion of the software process for the encryption (step S15) and the flow goes back to step S13.

Figure 11:
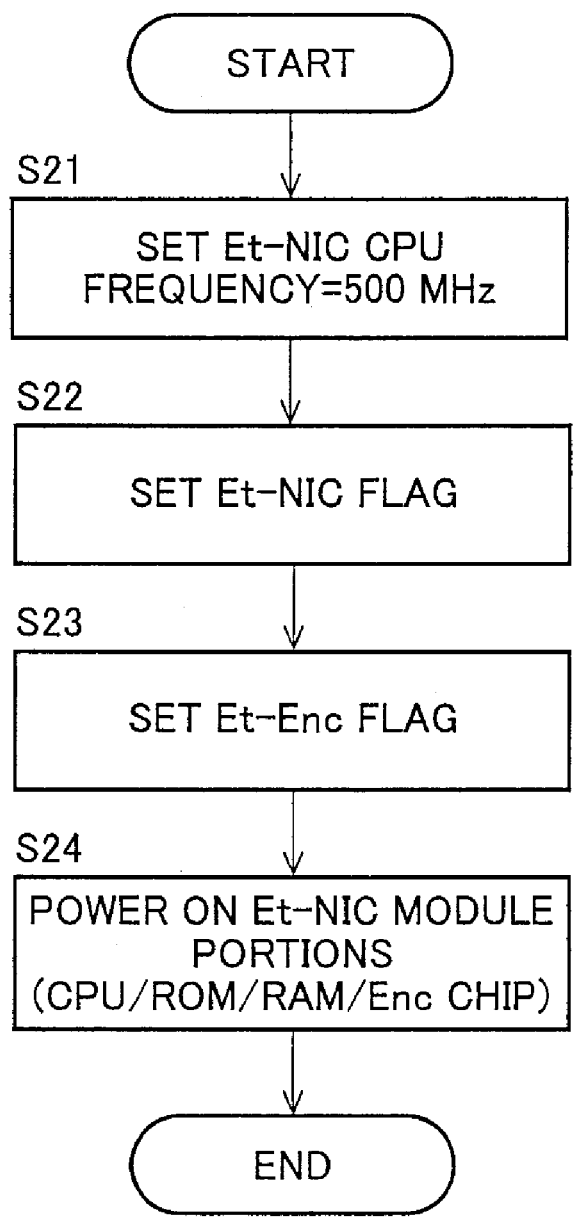
FIG. 11 is a flowchart of the energy-saving setting performed when the total value is 20 or more.

The energy-saving setting of step S5 of FIG. 9 will be described with reference to FIGS. 11 to 14. In the setting process executed in the case of the total value of 20 or more, as shown in FIG. 11, first, the operation clock frequency of the Et-NIC CPU 21 is set to 500 MHz (step S21); the Et-NIC flag is set (step S22); the Et-Enc flag is set (step S23); the Et-NIC module portions (the CPU 21, the ROM 22, the RAM 23, and the encryption chip 24) are powered on (step S24); and the process is terminated. As described above, the power-saving effect is not generated in the NIC 20 in this case.

Figure 12:
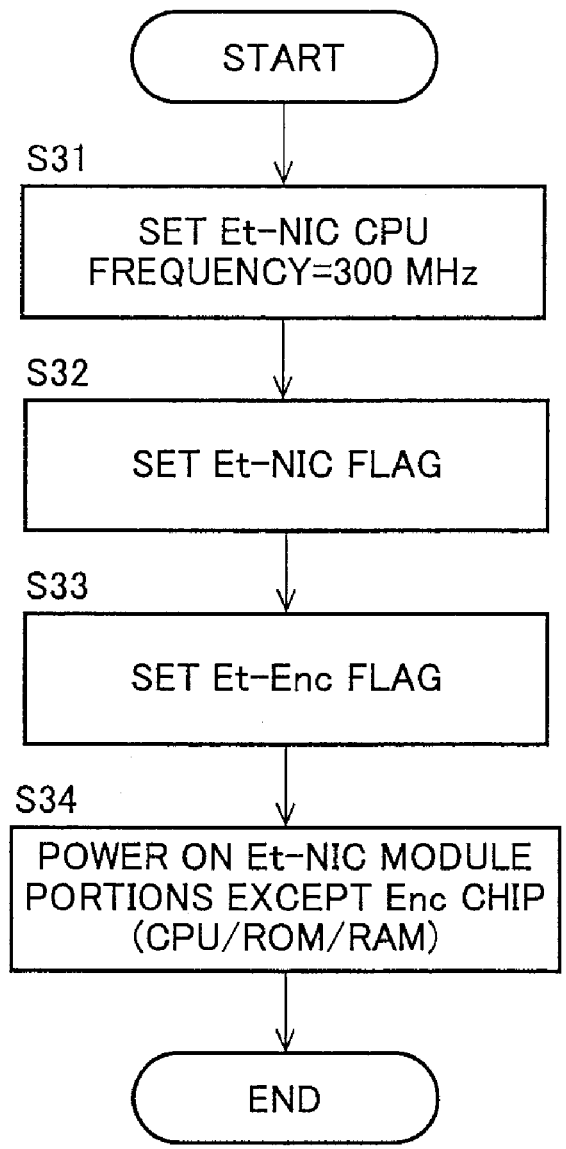
FIG. 12 is a flowchart of the energy-saving setting performed when the total value is 19 to 10.

In the energy-saving setting in the case of the total value of 19 to 10, as shown in FIG. 12, the operation clock frequency of the Et-NIC CPU 21 is set to 300 MHz (step S31); the Et-NIC flag is set (step S32); the Et-Enc flag is set (step S33); the Et-NIC module portions except the encryption chip 24 (the CPU 21, the ROM 22, and the RAM 23) are powered on (step S34); and the process is terminated.

Figure 13:
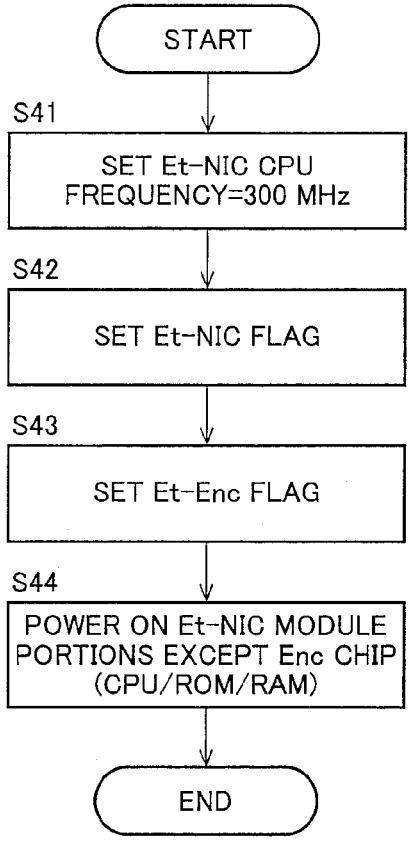
FIG. 13 is a flowchart of the energy-saving setting performed when the total value is 9 to 4.

In the energy-saving setting in the case of the total value of 9 to 4, as shown in FIG. 13, the operation clock frequency of the Et-NIC CPU 21 is set to 300 MHz (step S41); the Et-NIC flag is set (step S42); the Et-Enc flag is set (step S43); the Et-NIC module portions except the encryption chip 24 (the CPU 21, the ROM 22, and the RAM 23) are powered on (step S44); and the process is terminated.

Figure 14:
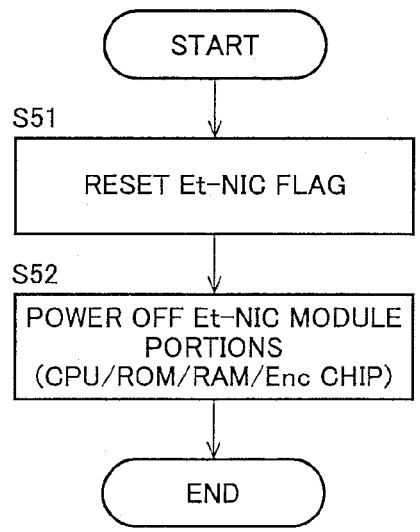
FIG. 14 is a flowchart of the energy-saving setting performed when the total value is 3 or less.

In the energy-saving setting in the case of the total value of 3 or less, as shown in FIG. 14, the Et-NIC flag is reset (step S51); the Et-NIC module portions (the CPU 21, the ROM 22, and the RAM 23) are powered off (step S52); and the process is terminated.

Figure 15:
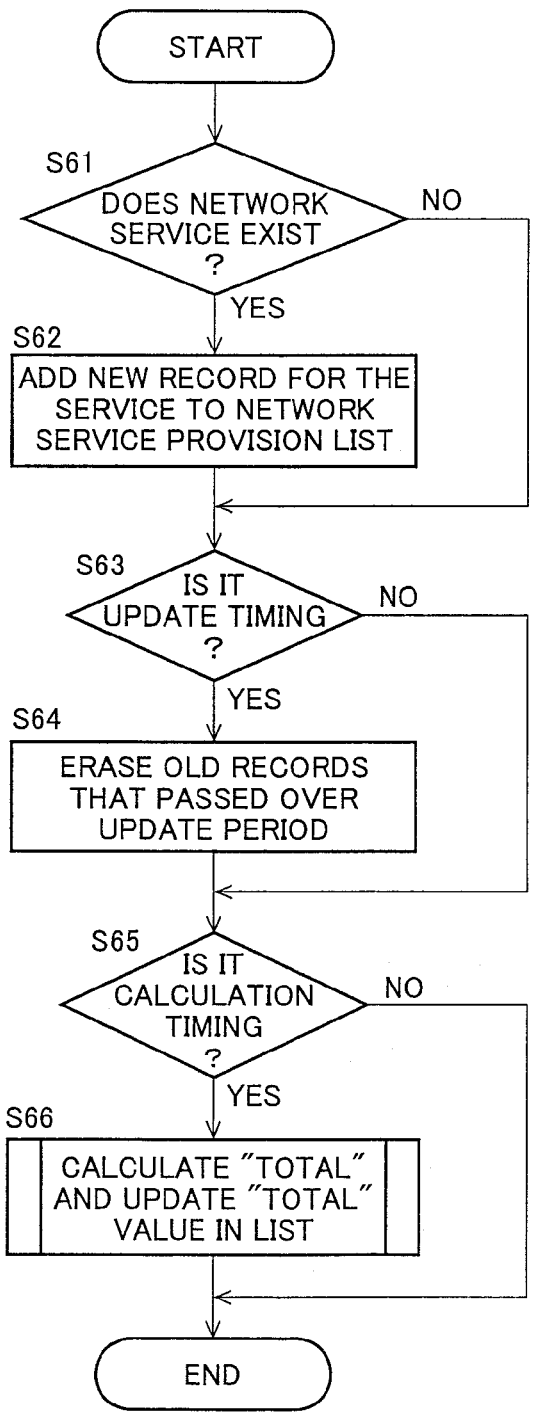
FIG. 15 is a flowchart of update of the network service provision list.

FIG. 15 is a flowchart of update of the network service provision list.

First, if a network service exists (step S61/Y), new records describing the information thereof are added to the items [time, (a) node IP address, (b) service, and (c) weighting value] of the network service provision list, and if no network service exists (step S61/N), the flow directly goes to the next step. If it is the update timing (step S63/Y), old records are erased, and if it is not the update timing (step S63/N), the flow directly goes to the next step. If it is the timing of calculating the total (step S65/Y), the total value is recalculated and updated in the list, and if it is not the update timing (step S65/N), the process is terminated.

Figure 16:
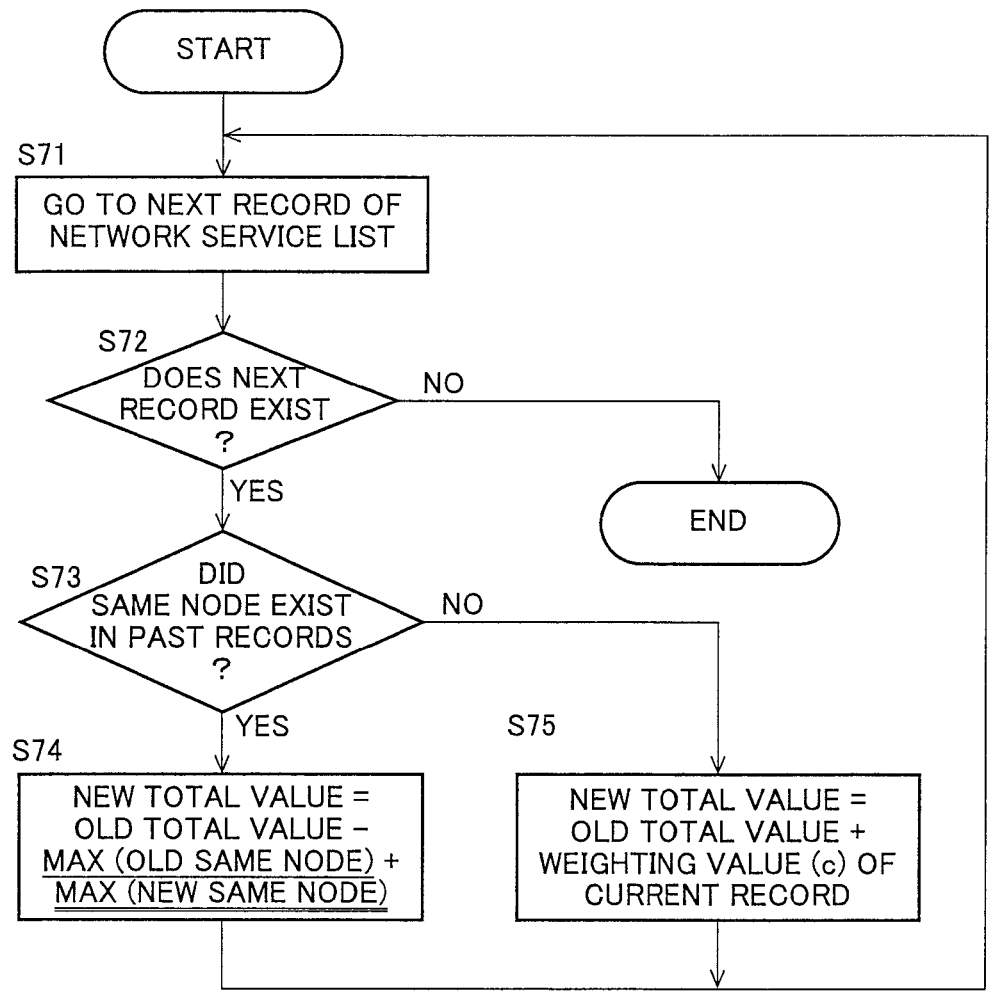
FIG. 16 is a flowchart of the calculation of the total value.

FIG. 16 is a flowchart of the calculation of the total value; as described above, the total value recalculation process is initiated when a predetermined time has elapsed after the previous calculation; a weighting value is attempted to be read for the next record of the record lastly added in the previous calculation (step S71); and if the next record exists (step S72/Y), it is checked whether the records of the same node (IP address) exist in the past records (step S73). If the records of the same node exist (step S73/Y), the new total value is calculated, i.e., the calculation is performed by subtracting the largest value of the past weighting values of the same node from the old total value and adding the largest weighting value of the records of the same node including the current record (step S74).

If the record of the same node is not included in the past records (step S73/N), the new total value is calculated by adding the weighting value of the current record to the old total value (step S75); the flow goes back to step S71 to repeat the above steps until no next record is found; and if no next record is found (step S72/N), the process is terminated.

Figure 17:
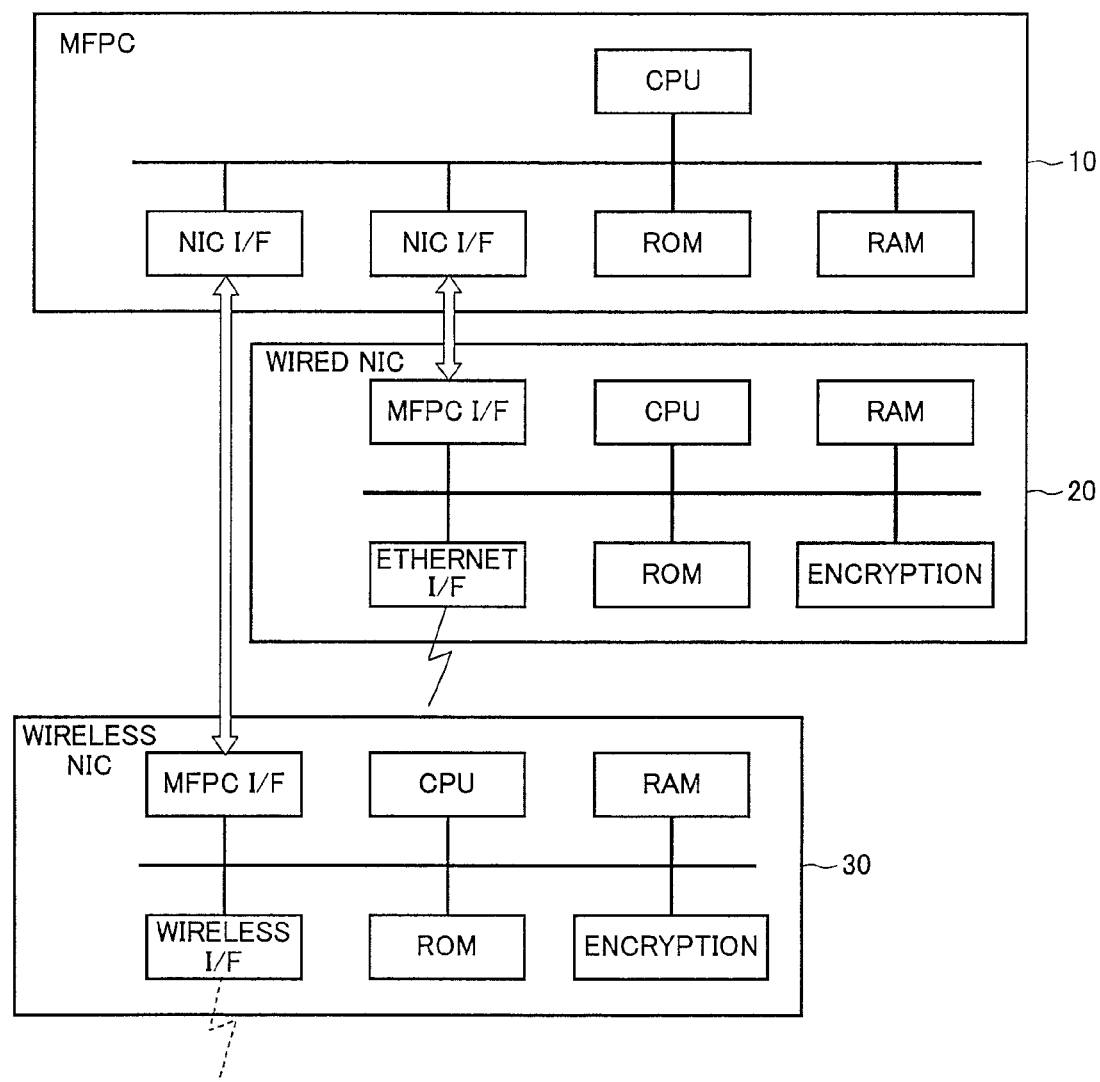
FIG. 17 depicts an example of connecting a plurality of the NICs to the printer controller as a second embodiment of the present invention.

In the present invention, the above power-saving control can be applied if a plurality of the NICs are connected to the printer controller 10, for example, if the Ethernet, i.e., wired NIC 20 and a wireless NIC 30 are connected as shown in FIG. 17.

In this case, the network service provision list can be created for each of the NICs, and not only the service request status but also the power-saving state of the other NIC can be added to the condition for determining the combinations of the energy-saving processes and the order of application thereof.

For example, when the service request status of the wireless NIC 30 is the total value of 10 or more, the above energy-saving processes (1), (2), and (3) are combined such that the protocol process of the wireless NIC is executed by the CPU of the NIC 30 if the CPU of the printer controller 10 is used for the protocol process of the wired NIC 20 and such that the protocol process of the wireless NIC 30 is executed by the CPU of the printer controller 10 if the CPU of the printer controller 10 is not used for the protocol process of the wired NIC 20.

Figure 18:
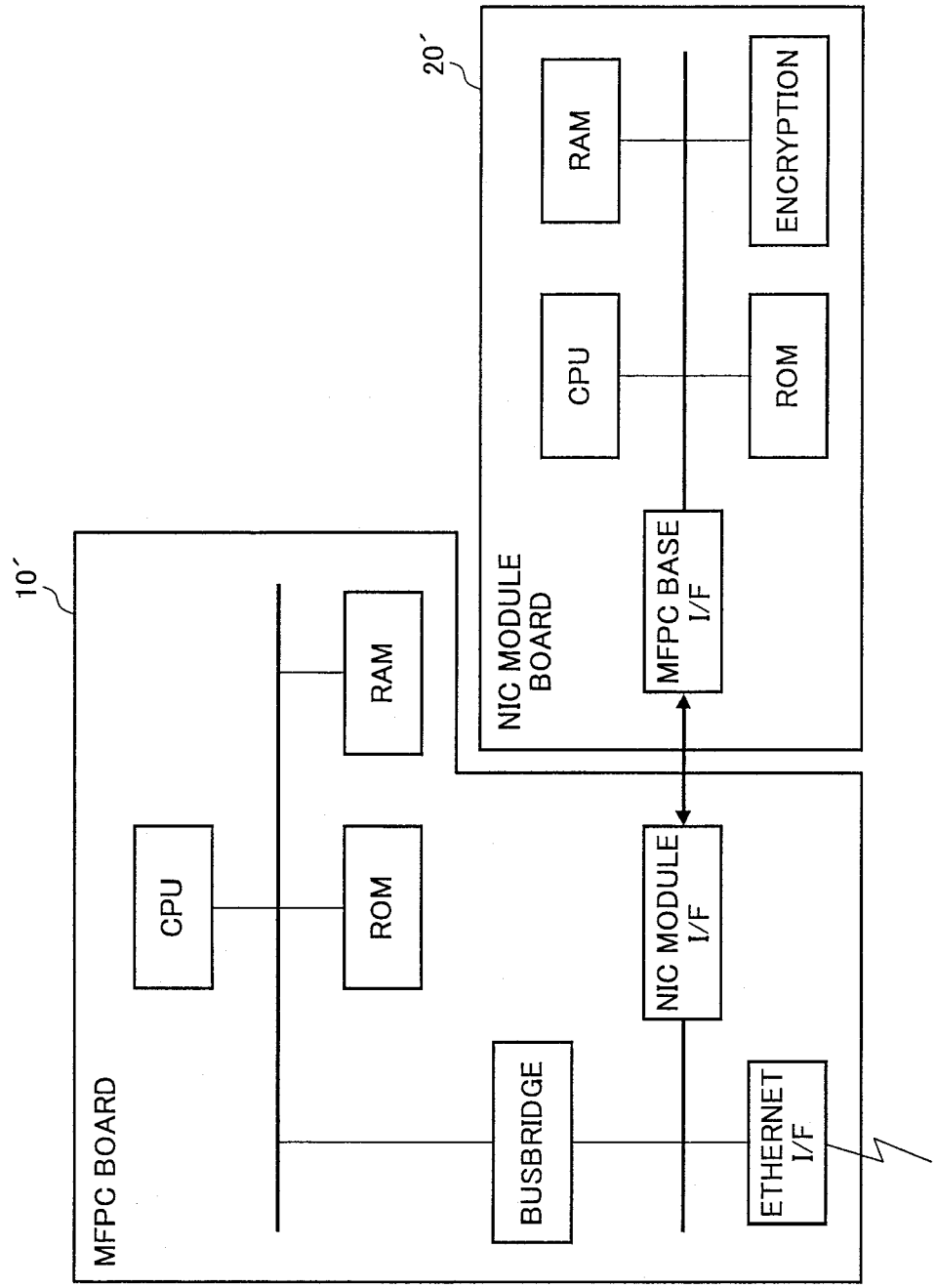
FIG. 18 depicts an example of configuring a NIC module board without the Ethernet I/F mounted thereon as a variation of the NIC used in the present invention.

FIG. 18 depicts an example of disposing an Ethernet I/F portion of the NIC on the printer controller to configure a NIC module board without mounting the Ethernet I/F on the NIC. In this case, if a printer controller 10' is enabled to execute a protocol process through a low-speed link, the MFP can give/receive data through a network even when a NIC module board 20' is not connected, and the NIC module board 20' is connected if needed.

In this case, the above power-saving control program is stored in the ROM or other storage portion disposed on the NIC module board, and the printer controller 10' is enabled to download the program when the board 20' is connected to the printer controller 10'.

In this case, since the power consumption for each operation clock frequency of the CPU and the power consumption of the encryption chip and other portions such as ROM and RAM are varied in the NIC depending on manufacturers, model numbers, etc., the information thereof is preliminarily stored in a storage portion such as a flash memory and the information is made readable when downloading the power-saving control program.

As described above, according to the present invention, while ensuring the process ability necessary for the services, the NIC of the system device can be driven to perform the optimum power-saving operation by employing the appropriate combination of a plurality of energy-saving processes suppressing the power consumption depending on the service request status.

According to the present invention, wasteful power consumption can be reduced in the NIC portion by causing the NIC to show the real performance when a multiplicity of services with high network process loads must be provided and by otherwise performing the power-saving control to reduce or terminate the performance of the NIC depending on the service request status.

According to the present invention, since the service request status is quantified and comprehended at predetermined time intervals and the power-saving control is performed by combining a plurality of energy-saving processes based on the condition thereof, the operation of the NIC can reasonably be adapted for the actual service request status.

The invention claimed is:

1. A system device comprising a NIC including a network I/F, a protocol process functional portion, and an encryption process functional portion as well as a controller responsible for overall control to provide various network services to external devices connected to a network, the controller performing, based on a condition determined depending on a service request status, power-saving control that selectively reduces or terminates processing abilities of the protocol process functional portion and/or the encryption process functional portion by applying to the protocol process functional portion and/or the encryption process functional portion of the NIC a combination of different energy-saving processes corresponding to the processing functions thereof to stepwise reduce electric power consumed by constituent elements of the process functional portions in accordance with the condition,
wherein the controller creates a network service provision list including at least record items that are information of time when service requests are made, identification information of nodes making service requests, types of requested services, and a weighting value of each type of services to determine the condition from the total value of the weighting values within a predetermined period.

2. The system device comprising a NIC as defined in claim 1, wherein each time the system device performs a requested service, the controller adds information including the items of the service as a new record to the network service provision list and deletes old records that passed over update periods at predetermined time intervals for maintenance.

3. The system device comprising a NIC as defined in claim 1, wherein the total of the weighting values is recalculated at predetermined time intervals.

4. The system device comprising a NIC as defined in claim 3, wherein when it is checked, based on the identification information of the nodes, whether the records of the same node exist in the past records and if the records of the same node exist, the recalculation of the total is performed by subtracting the largest value of the past weighting values of the same node from the old total value and adding the largest weighting value of the records of the same node including the current record.

5. The system device comprising a NIC as defined in claim 4, wherein the identification information is IP addresses.

* * * * *